United States Patent [19]

Price

[11] Patent Number: 5,168,832
[45] Date of Patent: Dec. 8, 1992

[54] PORTABLE FRAME FOR A CHICKEN BROODER CONDITIONED AIR SYSTEM

[76] Inventor: Roscoe S. Price, 7701 Osborne Pike, Richmond, Va. 23231

[21] Appl. No.: 735,535

[22] Filed: Jul. 22, 1991

[51] Int. Cl.$^5$ .................. A01K 31/20; A01K 31/19
[52] U.S. Cl. ......................... 119/33; 119/31; 261/106
[58] Field of Search ............. 119/31, 32, 33, 34, 119/35, 41; 261/106, 98, 94, 97

[56] References Cited

U.S. PATENT DOCUMENTS

| | | | |
|---|---|---|---|
| 601,677 | 5/1898 | Rappleye | 261/98 |
| 2,268,540 | 1/1942 | Andrews | 261/DIG. 15 |
| 3,363,531 | 1/1968 | Kohlmeyer et al. | 261/106 |
| 4,701,287 | 10/1987 | Manteufel | 261/106 |
| 4,773,471 | 9/1988 | Grant et al. | 119/31 |
| 5,015,420 | 5/1991 | Jones | 261/106 |

Primary Examiner—John G. Weiss
Attorney, Agent, or Firm—Longacre & White

[57] ABSTRACT

This device relates to a frame adapted for use as a chicken brooder conditioned air system comprised of a pressurized water supply, a supply hose through which the water from the pressurized water supply flows, an air permeable frame through which the water from the supply hose flows, with the frame being comprised of a first air permeable wall and a second air permeable wall, between which is positioned at least one water retaining porous material. The frame is also comprised of a drain to allow for the exiting of excess water such that water flowing between the first and second walls of the air permeable frame flows through and onto the water retaining porous material, wherein air flows through the first wall, the water retaining porous material and the second wall and is directed towards the chicken brooder, thereby regulating the temperature of the chicken brooder.

12 Claims, 4 Drawing Sheets

PORTABLE FRAME FOR A CHICKEN BROODER CONDITIONED AIR SYSTEM

BACKGROUND OF THE INVENTION

1. Field of the Invention

This invention relates to a portable frame for a chicken brooder conditioned air system for either heating or cooling a chicken brooder. The frame for a chicken brooder conditioned air system is comprised of a holding tank capable of being filled with water, a pump for pumping the water from the holding tank, a supply hose through which the water from the pump flows, and an air permeable frame through which water from the supply hose flows. The frame is comprised a first and second air permeable wall, between which is positioned at least one water retaining porous material, over which the water from the supply hose flows.

2. Description of the Prior Art

Brooders are enclosures where young chickens or other fowl are raised. In brooders, the amount of feed and other environmental factors are carefully monitored and controlled so that the young chickens remain healthy and gain weight rapidly allowing them to be moved to market faster than if the young chickens had been raised in their natural environment. By controlling the young chickens' nutritional and environmental requirements in a brooder, the level of cannibalism, a problem endemic among chickens, is greatly reduced. Another problem that the brooder may resolve is the regulation of the temperature. If the brooder is too cold, the young chickens can catch pneumonia or other diseases and die. If the brooder is too warm, particularly in summertime, then the young chickens will die of respiratory disorders.

There have been numerous attempts to build a system that will efficiently either heat or cool the brooder.

U.S. Pat. No. 1,837,065 (Pierce) is for a chick brooder which circulates warm air through the brooder using steam or hot water pipes leading to heating coils preferably arranged along the side walls of the house and high enough to leave aisles therebeneath. Arranged between the aisles are banks or tiers of brooder trays having walls of wire mesh. An inlet conduit in the form of a fan allows fresh air to circulate through the brooder. In order to humidify the air drawn into the chamber, a perforated pipe is connected to one of the coils to allow steam to enter the housing for moistening the air drawn therein.

U.S. Pat. No. 1,922,086 (Hart) is for a chicken brooder which takes in air from outside the brooder. During cold weather, the air which is circulated through the brooding chamber is heated by steam, vapor or hot water which is circulated through coils of pipe. Each coil is enclosed in a boxlike structure or casing and is connected by suitable piping to a common supply pipe which in turn is connected to a boiler. Heater boxes are placed in a space above the ceiling known as an auxiliary chamber, with each of the boxes being located directly above one of the side corridors or compartments in the assembly in parallel relation to the outer walls.

U.S. Pat. No. 3,396,703 (Trussell) is for a poultry hatching apparatus in which vertically disposed porous or pervious curtains descend from the ceiling and serve together with the walls of the building to form a plenum chamber on either side of the building. A fresh air inlet and purification apparatus is located on the wall beneath the eaves formed by the roof. A longitudinally disposed spray rack is located in the chamber formed by the roof and ceiling. These racks have nozzles arranged to provide a curtain of water across the intake of the chamber. Located proximate to the lower edge of the curtain, a water collecting trough runs longitudinally along the wall of the building to collect and return water from the spray racks.

U.S. Pat. No. 4,773,471 (Grant et. al.) relates to heating and cooling systems for poultry buildings. The buildings have adjustable side curtains, an electrical source, a pressurized gas fuel source and a pressurized water source available for utilization by the system. The system is comprised of a main forced-air heating and cooling system having an inlet port and outlet port for forcing conditioned air into a mainstream airflow pattern with the poultry building, a plurality of booster fans means for helping to circulate the air, a control means for electronically controlling the operation of the heating and cooling system, and a set of emergency fans for use as a back-up means for maintaining air flow to livestock in the event of loss of the main system. The cooling means has a water piping arrangement positioned at the outlet port and having spray nozzles for injecting mist into the airflow stream and being hydraulically coupled to a relay controlled water pump and to the pressurized water source.

U.S. Pat. No. 5,012,763 (Morrison) is for a portable plastic aquabrood which has an enclosed animal habitat chamber assembly and an enclosed water chamber assembly. These two structures have a common end wall and a bottom wall, with a submersible heater mounted in the water chamber assembly along with a thermometer. An aperture in the common upright end wall of the two assemblies has a valve that can be opened or closed to varying degrees to adjust the humidity in the animal habitat chamber assembly.

SUMMARY OF THE INVENTION

Many current chicken brooders, which can be quite large and built to breed tens of thousands of chickens at a time, do not have adequate inexpensive methods or devices for keeping the chickens cool or warm, or for adequately regulating the temperature of the brooders. The devices cited in the prior art are costly and do not provide an inexpensive means for both cooling and heating the brooders, nor do they provide means for modifying current brooders.

The present invention is for a frame adapted for use as a chicken brooder conditioned air system. This frame can be easily installed in current chicken brooders to provide the necessary humidity and cooling and heating features that the brooders lack. The frame adapted for use as a chicken brooder condition air system is comprised of a pressurized water supply, a pump for pumping water from the pressurized water supply, a supply hose through which the water from the pump flows, and an air permeable frame through which the water from the supply hose flows, the frame being comprised of a first air permeable wall and a second air permeable wall, between which is positioned at least one water retaining porous material. The frame also has a drain to allow for the exiting of excess water such that water flowing between the first and second walls of the air permeable frame flows through and onto the water retaining porous material, wherein air flows through the first wall, the water retaining porous material, and the second wall, and is directed towards the chicken brooder, thereby regulating the temperature of the chicken brooder.

The porous material within the frame is preferably comprised of lava rock and aspen wood, separated by a divider which is comprised of mesh galvanized wire. This allows for the free flow of air perpendicular to the frame. Similarly, the first and second walls of the frame should also be comprised of a mesh galvanized wire to allow for the free flow of air. It is preferable that the metal of the frames be comprised of one inch expanded metal.

The pressurized water supply should be comprised of a holding tank capable of being filled with water and a pump for pumping the water from the holding tank.

In a preferred embodiment, the frame adapted for use as a chicken brooder is further comprised of a thermostat for regulating the temperature of the air of the chicken brooder by water flowing through the conditioned air system. A circulating water cooling and heating system which operates in conjunction with the thermostat sends cool water through the air system when the air inside the chicken brooder is too warm and sends warm water through the air system when the air inside the chicken brooder is too cool. The heating system may be comprised of a heat pump.

The circulating water cooling and heating system is preferably a closed or semi-closed system such that after the water has circulated between the first and second walls of the frame, it is returned to the holding tank for recirculation through the air system. Additionally a fan is attached to the frame drawing air from the outside of and through the frame.

DETAILED DESCRIPTION OF THE PREFERRED EMBODIMENTS

Figure 1:
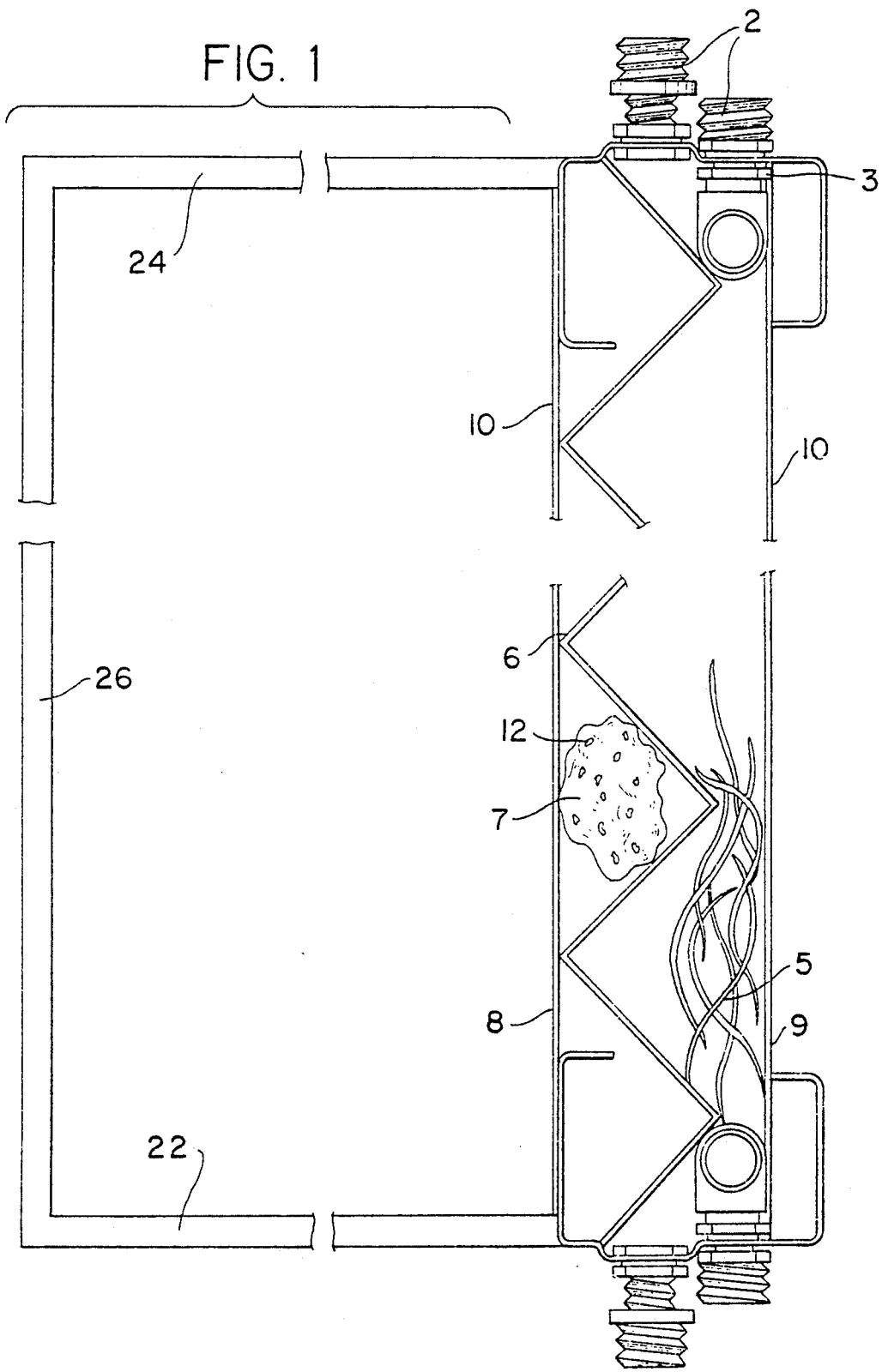
FIG. 1 is a side view of the frame of the invention.
Figure 2:
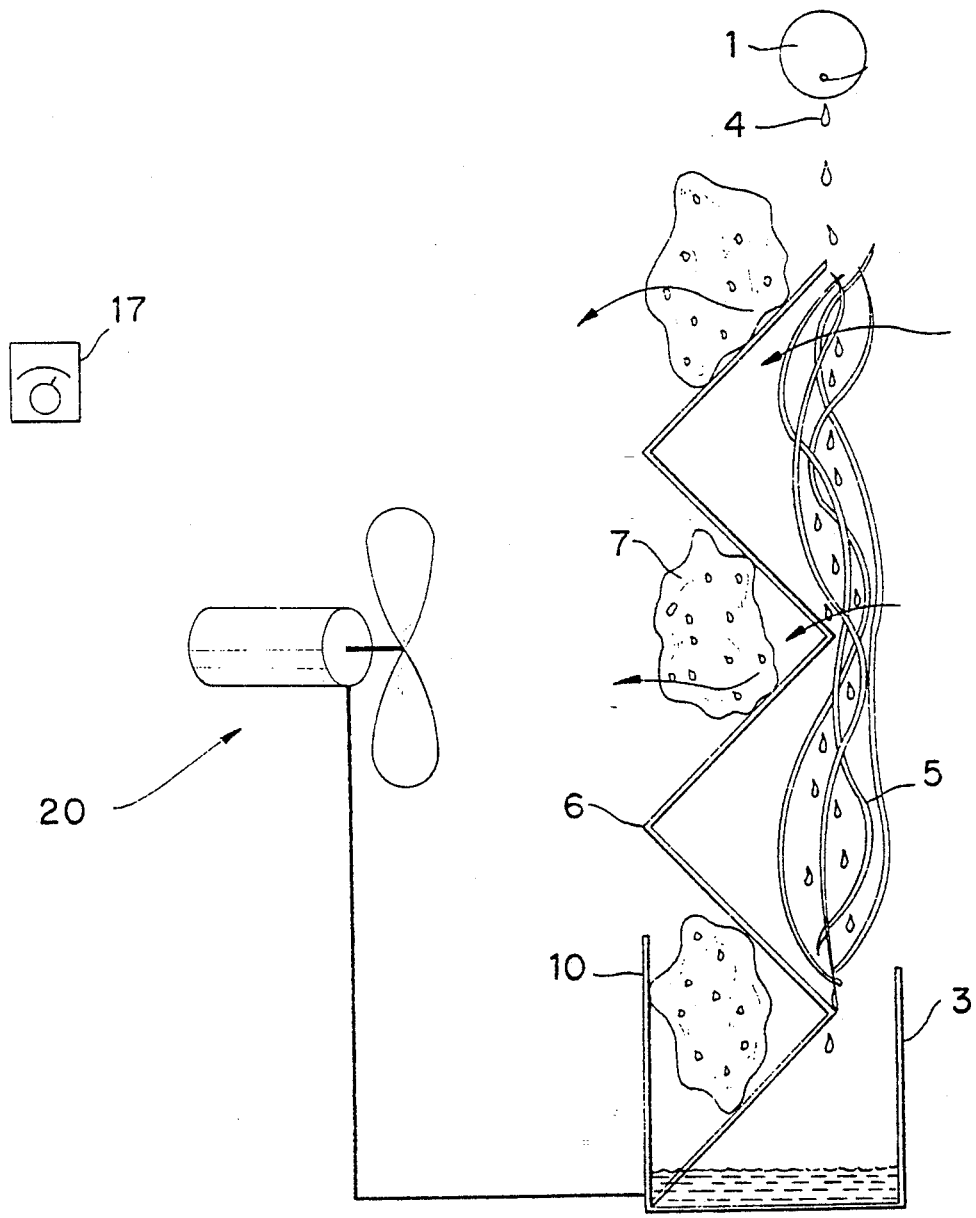
FIG. 2 is a schematic side view of the frame of the invention, showing the flow of air through the frame.

FIGS. 1 and 2 show some of the elements of the frame of the invention. A plastic or rubber supply hose or piping 1 is attached to an adapter 2 which in turn feeds into the frame 3. The water may flow in a steady stream or may be a stream of droplets 4, as shown in FIG. 2. The water drops down onto strips of aspen wood 5, which help retain the beads of water and through which air passes. A ½ inch mesh galvanized wire 6 separates the aspen wood 5 from the lava rock 7. The lava rock 7 is light and porous and allows air to pass through. In a preferred embodiment water is also being dripped over the lava rock 7.

Figure 3:
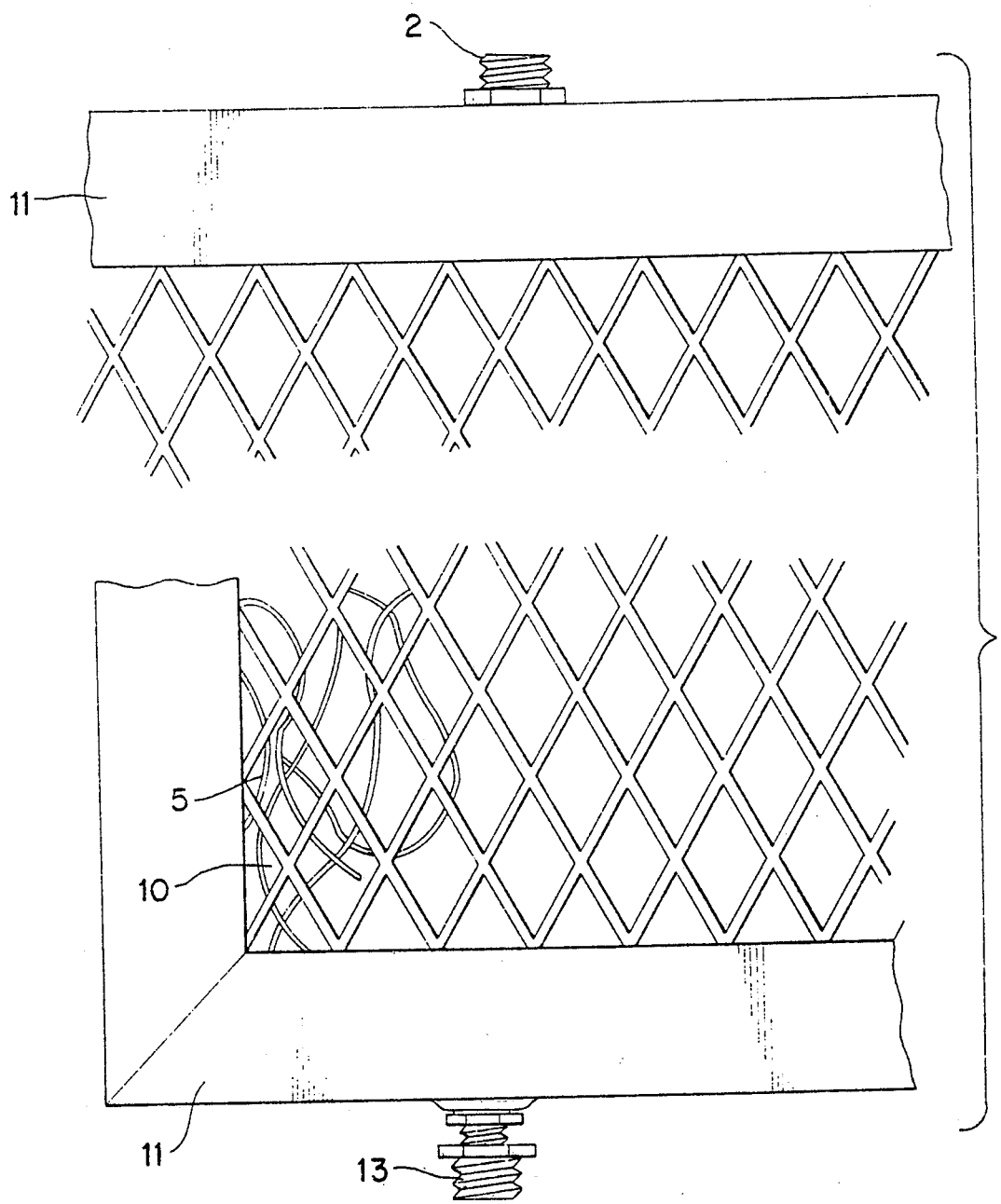
FIG. 3 is a back view of the frame of the invention.

Both the lava rock 7 and the aspen wood 5 are positioned between a first wall 8 and a second wall 9. Both walls are porous and are preferably made out of galvanized expanded metal wire 10 with a welded frame 11 holding the wire 10 in place, as shown in FIG. 3. As water drips down over the aspen wood 5 and over the lava rock 7, air from outside the frame blows through the second wall 9, through the aspen wood 5, through the lava rock 7, and through the first wall 8. As the air travels through the frame, it is cooled as it passes through the water laden aspen wood 5 and the lava rock 7. The numerous pores 12 in the lava rock 7 allow for increased cooling and dispersion of the air. A fan 20 inside the frame or inside the brooder can assist in drawing in air from outside the frame.

Figure 4:
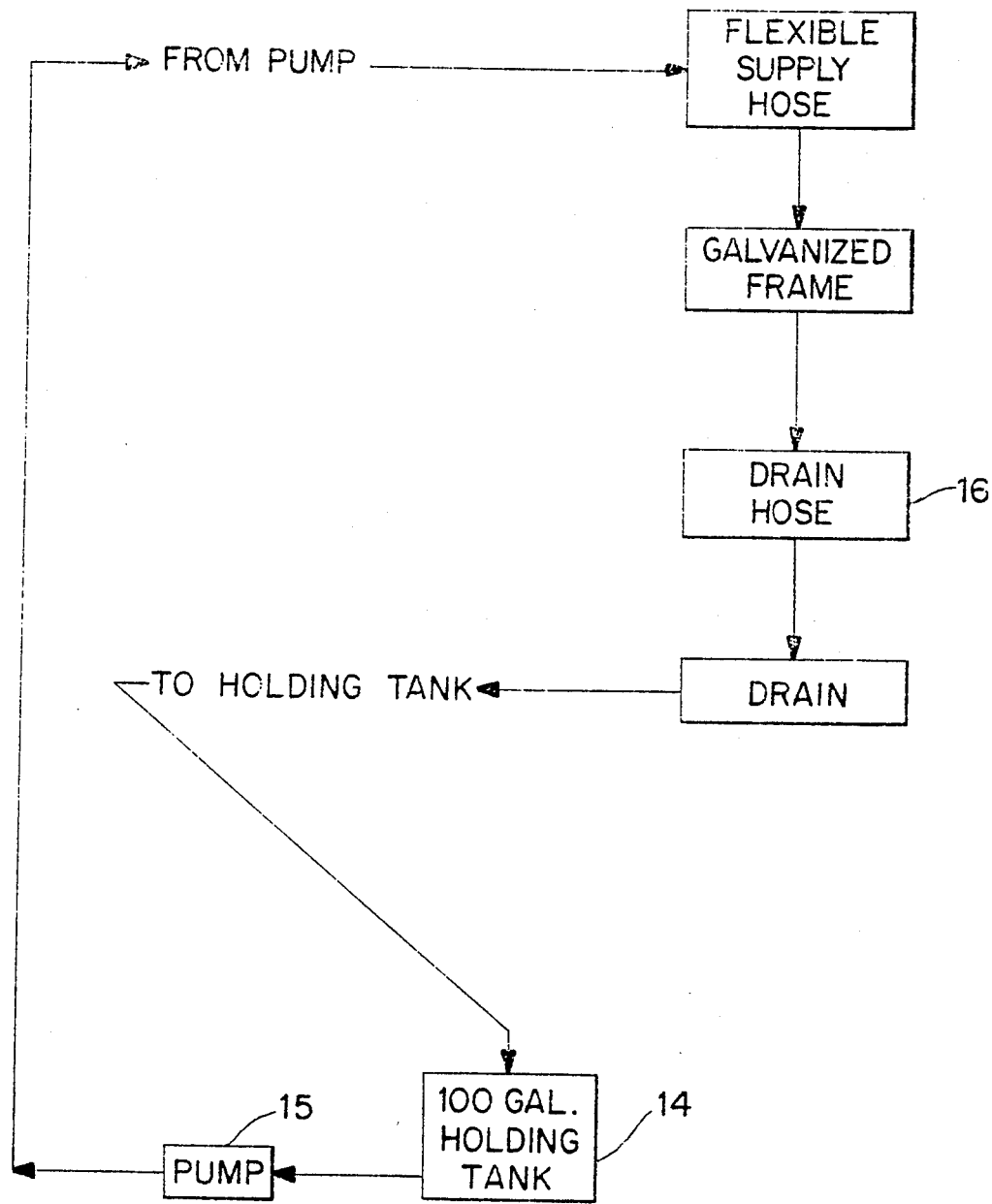
FIG. 4 is a schematic view of the flow of water through the frame of a preferred embodiment of the invention.

The frame is also fitted with a drain 13 to allow the water to run out from the bottom of the frame. In a preferred embodiment of the invention, this "surplus water" is returned to a holding tank 14 (see FIG. 4) via a flexible drain hose 16. A pump 15 is attached to the holding tank which pumps water to the supply hose 1 which supplies the frame with water.

In yet another preferred embodiment of the invention a heating 18 and/or cooling 19 device may be connected to the holding tank so as to either cool or heat the water that is circulating through the frame. A thermostat 17 inside the brooder determines whether the temperature of the brooder needs to be raised or lowered. Cool water is sent through the air system when the air inside the chicken brooder is too warm, and warm water is sent through the air system when the air inside the chicken brooder is too cool.

The frame described above may be used either as sides of a chicken brooder itself or the frame may be portable for use as a chicken brooder conditioned air system inside an already existing brooder.

As shown in FIG. 1, the frame as described above serves as a peripheral facade of the chicken brooder itself. Thus, the chicken brooder has a horizontally oriented floor 22, a horizontally oriented ceiling 24, and a plurality of vertically oriented sides, shown generally as side 26. The frame 11 of the instant invention is shown in FIG. 1 as one of the sides of the brooder.

To make the panel perform properly and without harm to the chicken fowl owing to over moist air, it must be understood that the air passing through the panels is cooled by virtue of the passing air contacting the cooled surface of the panels themselves. Importantly, the passing air is not only cooled by the cooler temperature of the water when compared with ambient, but is cooled predominantly by contact with the cooled wood or porous rock. Rather, the panel material, either rock or wood, is cooled by evaporation of the draining water through the porous material. The evaporation is possible since the surface area of the water is greatly expanded through the capillary action of the porous material. Hence, the temperature of the panel materials themselves are reduced owing to the latent heat removal from the underlying material in the panels. (This is the same phenomena which explains the cooling of a bottle of fluid by wrapping it in wet paper and allowing the water to evaporate.) In this manner the passing air is cooled without unduly raising the moisture content of the air and possibly harming the fowl. By way of example—for an Aspen wood panel, water may be supplied at an approximate rate of 3 gallons per minute to treat 400 linear feet of panel. Emitters are positioned regularly along an upper edge of the panel, and evenly distribute the water along the length thereof. This rate of distribution is, of course, approximate. A plurality of other rates may be selected depending on ambient temperature, humidity, and the cooling and humidity requirements of the brooder air. A balance between these factors is readily achieved by modest monitoring and appropriate adjustment of the flow and distribution rates of the water or other cooling fluid.

Although particular embodiments of the present invention have been described and illustrated herein, it should be recognized that modifications and variations may readily occur to those skilled in the art and that such modifications and variations may be made without departing from the spirit and scope of the invention. Consequently, the invention as claimed below may be practiced otherwise than as specifically described above.

What is claimed is:

1. A peripheral facade of a chicken brooder having a horizontally oriented floor, a plurality of vertically oriented peripheral facades and a horizontally oriented ceiling, said peripheral facade comprising:
   a frame delimiting said peripheral facade;
   a first air permeable wall bounded by said frame and a second air permeable wall spaced apart from said first permeable wall and also bounded by said frame;
   at least one water retaining porous material located between said first and second air permeable walls;
   a pressurized water supply adapted to be distributed over said at least one water retaining porous material; and
   at least one drain adapted for egress of excess water exiting from said frame;
   wherein water is distributed over said at least one water retaining porous material between said first and second air permeable walls by said pressurized water supply whereupon evaporation of said water cools said at least one water retaining porous material, and wherein air flows through said first and second air permeable walls with said at least one water retaining porous material therebetween whereupon said air is cooled by contact with said at least one water retaining porous material.

2. The frame adapted for use as a chicken brooder conditioned air system according to claim 1, wherein said porous material is comprised of lava rock.

3. The frame adapted for use as a chicken brooder conditioned air system according to claim 2, wherein said water retaining porous material is further comprised of aspen wood.

4. The frame adapted for use as a chicken brooder conditioned air system according to claim 3, wherein said lava rock and said aspen wood are separated by a divider.

5. The frame adapted for use as a chicken brooder conditioned air system according to claim 4, wherein said divider is comprised of mesh galvanized wire.

6. The frame adapted for use as a chicken brooder conditioned air system according to claim 1, wherein said first and second walls of said frame are comprised of metal.

7. The frame adapted for use as a chicken brooder conditioned air system according to claim 6, wherein said metal is comprised of one inch expanded metal.

8. The frame adapted for use as a chicken brooder conditioned air system according to claim 1, being further comprised of an adjustable thermostat for regulating the temperature of the air of the chicken brooder by water flowing through said chicken brooder conditioned air system, a circulating water cooling system which operates in conjunction with the thermostat sending cool water through the air system when the air inside the chicken brooder is too warm.

9. The frame adapted for use as a chicken brooder conditioned air system according to claim 8, wherein said cooling and system is comprised of a heat pump.

10. The frame adapted for use as a chicken brooder conditioned air system according to claim 1, wherein said pressurized water supply is comprised of a holding tank, said holding tank capable of being filled with water, and a pump for pumping said water from said holding tank.

11. The frame adapted for use as a chicken brooder conditioned air system according to claim 1, wherein a fan is attached to said frame drawing air from the outside of and through said frame.

12. The frame adapted for use as a chicken brooder conditioned air system according to claim 1, wherein said circulating water cooling system is a closed system, such that said water after circulating between said frame is returned to said holding tank for recirculation through the system.

* * * * *